United States Patent
Ahlbom et al.

Patent Number: 5,990,833
Date of Patent: Nov. 23, 1999

[54] SYSTEM FOR DIRECTION DETERMINATION

[75] Inventors: Sten Ahlbom, Västra Frölunda; Bengt Andersson, Kullavik, both of Sweden

[73] Assignee: Telefonaktiebolaget LM Ericsson, Stockholm, Sweden

[21] Appl. No.: 08/970,752

[22] Filed: Nov. 14, 1997

[30] Foreign Application Priority Data

Nov. 15, 1996 [SE] Sweden .................................. 9604233

[51] Int. Cl.⁶ ...................................................... G01S 5/02
[52] U.S. Cl. ........................................... 342/417; 342/444
[58] Field of Search .................................... 342/378, 417, 342/444; 367/125, 124

[56] References Cited

U.S. PATENT DOCUMENTS

| | | | |
|---|---|---|---|
| 3,878,381 | 4/1975 | Broder et al. ....................... | 342/417 X |
| 4,209,835 | 6/1980 | Guadagnolo . | |
| 5,045,860 | 9/1991 | Hodson . | |
| 5,285,209 | 2/1994 | Sharpin et al. . | |
| 5,396,250 | 3/1995 | Tsui et al. . | |
| 5,477,227 | 12/1995 | Noneman . | |
| 5,512,908 | 4/1996 | Herrick ................................... | 342/387 |

FOREIGN PATENT DOCUMENTS

| | | |
|---|---|---|
| 984970 | 3/1976 | Canada . |
| 452 023 | 10/1991 | European Pat. Off. . |
| 524 771 | 1/1993 | European Pat. Off. . |

*Primary Examiner*—Mark Hellner
*Attorney, Agent, or Firm*—Burns, Doane, Swecker & Mathis, LLP

[57] ABSTRACT

System for determining the position of radar transmitters where the system includes at least one information center with associated cells and means of communication between the information center and the cells with a restricted transfer rate utilising existing infrastructure in the country, such as for example a national telephone network and also mobile telephone networks and their base stations. Each cell includes at least one sensor in order to be able to detect radar signals. Leading edges of pulses in the radar signals are detected and time-marked after which they are sorted according to PRI (Pulse Repetition Interval). The time of arrival for the first pulse in a pulse train is calculated and data reduced by modulo calculation to a value that as a maximum is the propagation time difference for pulses between two cells in a pair of cells/sensors that are used together for calculating the bearing. Bearings calculated from at least two pairs of cells are correlated in the information center which thereafter calculates the position of the radar transmitter.

26 Claims, 7 Drawing Sheets

SYSTEM FOR DIRECTION DETERMINATION

BACKGROUND

This invention concerns a system and a method for the passive determination of the bearing of detectable objects and also the determination of the position of these by the monitoring of a large geographical area using a number of sub units.

Over a large geographical area—a border area, province, coastline, major road network, urban area, airport, etc—there is often a need to guard and monitor in order to be able to determine the position of objects that can be observed using physical measuring methods. The objects can for example be vehicles, boats, aeroplanes or helicopters and can for example be detected with the aid of the electromagnetic signals that the objects generate/transmit. Aeroplanes, helicopters and boats usually use some form of radar to assist navigation. A radar transmits electromagnetic signals within the radio frequency range. A radar's design varies for example depending upon the area of use, type of radar, frequency range used and upon whether it is airborne, or land- or sea-based.

In order to be able to determine the position of electromagnetic transmitting objects, such as electromagnetic emitters or transmitters within the radio frequency range, by cross-bearing, the bearing of the object must first be calculated from at least two different places. The calculation of bearings of electromagnetic transmitters can be carried out in many different ways of which interferometers, "Scan Time of Arrival" that measures the time of scanning in sub units, and "Differential Time of Arrival" (DTOA) methods are just some examples out of many.

For calculation of bearings by the interferometer method two receiver aerials in a sub unit should be placed at a distance from each other that is equal to one or several wavelengths of a target transmitter's carrier wave frequency. using two precisely electrically-matched receivers, one for each aerial, the difference in phase of the received carrier wave frequency between the two receivers is compared in an evaluation unit. The sub unit should be electrically symmetrical from the evaluation unit to both receiver aerials.

The phase difference at a particular frequency is a measurement of the time difference in reception by the respective receiver aerials that has arisen for the interesting signal due to the difference in path of propagation from the transmitter to the respective receiving aerials with full symmetry. A zero phase difference corresponds to equal paths of propagation, which means that the transmitter is located on the perpendicular from the midpoint of the line between the aerials (the base line for bearing measurement). The frequency of the carrier wave here consists of the relative time reference for the sub unit's two receivers. From the difference in the path of propagation the bearing of the transmitter relative to the direction of the base can be calculated with possible ambiguity if the phase difference exceeds 180°.

The measured bearing for an interesting signal is recorded together with a time specification for the measurement. The time specification should be sufficiently accurate for a corresponding measurement taken at another sub unit at a suitable distance from the first sub unit to be able with reasonable certainty to refer to the same transmitter situated in at least approximately the same place. Using reports from a number of sub units to a central unit an evaluation unit in the central unit can calculate the position of the transmitter. The evaluation unit uses bearings reported from at least two sub units situated at a suitable distance that were recorded at times that are so close that they can be taken as referring to one and the same scan. The length and geographical direction of the larger measuring base (the measuring base for cross-bearing) namely that between relevant sub units, must also be known.

The interferometer method can give a high degree of accuracy in bearings, but is relatively expensive and difficult to calibrate as a large number of well phase-calibrated receiver channels are required. The ambiguity if the phase difference exceeds 180° must be resolved satisfactorily in order for the method to be able to give reliable bearings. The sensitivity is relatively low as a large signal/noise ratio is required in order to be able to measure the phase difference with a sufficiently high degree of accuracy. Also the data connection between sub units and information centre is complicated and expensive as the data rate must be sufficiently rapid in order to be able to transmit bearing data and times of bearing data with sufficiently high accuracy.

The method that is called DTOA is in principle similar to the interferometer method described above; the bearing of the transmitter can be determined using measured propagation time differences to two receiver aerials for signals from the same transmitter. Instead of measuring the phase difference, in this case the difference in time of arrival (TOA) is measured for both receivers of for example one and the same pulse.

Also here a symmetrical set-up is required and therefore any differences in propagation times in the connections should be compensated for in some way so that for the measured time difference zero between the received pulses in both receiver aerials, the transmitter is actually situated on the perpendicular through the midpoint of the base line. Methods of compensating for propagation time should fulfil the requirements for accuracy under varying external conditions, such as for example various ambient temperatures. The bearing measurements from a number of sub units are used otherwise in the same way as in the interferometer method to determine the position of the transmitter.

An accurate time measurement and a time synchronisation between sub units is necessary in this case. Also here complicated data connections and complicated sub units are usually required.

As mentioned "Scan Time of Arrival" is a third method of calculating bearings. The method is based on measuring the time of scanning of a radar scan with fixed rotational speed in different sub units located at relatively large distances from each other. A great disadvantage of Scan Time is that the method has a relatively narrow area of use.

An additional problem with these above-mentioned methods is the correlating of time measurements between different sub units and between sub units in pairs of sub units for the same transmitter. The correlation of bearings for the same transmitter between different sub units and between different pairs of sub units is also a problem. The transmitters must be classified in some way so that the times and bearings can be connected with the right transmitter.

The American patent U.S. Pat. No. 5,285,209 "Angle-of-Arrival Measurement via spectral estimation radar Time-of-Arrival periodicities" describes how DFT (Discrete Fourier Transformation) can be used on a series of TOA data to calculate "Pulse Repetition Frequencies" (PRF) for a pulse train or several superposed pulse trains. The American patent U.S. Pat. No. 5,396,250 describes in detail how the Fourier transformation is used to determine the properties of pulse trains with fixed or varying PRF. The method in accordance with U.S. Pat. No. 5,285,209 is used to determine the time difference for the reception of a pulse train between two receivers. The receivers work with a common reference clock. The bearing of a transmitter of the pulse train can be calculated from the difference in time/phase.

None of these patents deals with problems concerning the transmission of data between the sub units and a central unit, problems concerning the time synchronisation of individual receivers with the use of a large measuring base or problems concerning how a system for the determining of =position should be designed. In addition the use of calculation-intensive methods such as the Fourier transformation in sub units can be regarded as a disadvantage as this unavoidably leads to these units being complicated and expensive as the Fourier transformation requires a lot of resources as a result of being calculation-intensive.

SUMMARY

An aim of the invention is therefore to specify a system that in a simple way makes it possible to monitor and determine the position of detectable objects/phenomena such as electromagnetic transmitters/emitters in a large geographical area.

A further aim of the invention is to create a system by means of which it is possible at a low cost to achieve a satisfactory accuracy in determining the position of detectable objects/phenomena such as electromagnetic transmitters/emitters in a large geographical area.

Yet another aim of the invention is to specify a system and a procedure/method for the data reduction of detected times of arrival of for example pulse trains from electromagnetic transmitters in order to be able to utilise a data connection to an information centre with a low transmission rate.

The specified aims are achieved by means of a system in accordance with the invention for determining the position of detectable objects/phenomena such as objects/phenomena that emit electromagnetic signals for example within the radio frequency range. The system comprises at least one information centre with associated cells that can be divided into one or more groups. The system also includes associated means of communication with a restricted transmission rate between the cells and the information centre. Each cell comprises at least one sensor in order to be able to detect with physical measuring methods the electromagnetic signals, for example within the radio frequency range, that the objects transmit/generate. Leading edges of pulses in the electromagnetic signals are detected and time- marked after which they are sorted in accordance with suitable criteria depending upon the type of signal. An example of a suitable criterion for sorting could be PRI (Pulse Repetition Interval which is equal to 1/PRF, Pulse Repetition Frequency). A time of arrival for the first pulse in a pulse train is calculated and data reduced. The data reduction is carried out by modulo-calculation to a value that as a maximum is the propagation time difference for pulses between two cells in a pair of sensors/cells. Bearings calculated from at least two pairs of sensors/cells are correlated in the information centre which thereafter calculates the position of the object/phenomena that is transmitting electromagnetic signals within for example the radio frequency range. By this means the system can utilise existing infrastructure in the country, for example a national telephone network and also mobile telephone networks and their base stations, for data connections between cell and information centre.

The specified aims are also achieved by means of a system in accordance with the invention for determining the position of radar transmitters. The system comprises at least one information centre with associated cells and a means of communication between the information centre and the cells with a restricted transmission rate utilising existing infrastructure in the country, for example a national telephone network and also a mobile telephone network and its base stations. Each cell comprises at least one sensor in order to be able to detect radar signals. Leading edges of pulses in the radar signals are detected and time-marked after which they are sorted in accordance with FRI (Pulse Repetition interval). A time of arrival for the first pulse in a pulse train is calculated and data reduced. The data reduction is carried out by modulo-calculation until the calculated time of arrival has a time value that is as a maximum the propagation time difference for pulses between two cells/sensors in a pair of cells/sensors that is used for calculating bearings. Bearings calculated from at least two pairs of cells/sensors are correlated in the information centre which thereafter calculates the position of the radar transmitter.

The specified aims are also achieved by means of a procedure/method and a system for data reduction of times of arrival of for example pulse trains in radar signals detected by a cell. After detection the times of arrival are measured for leading edges of pulses of consecutive pulses in the pulse train relative to a start of a time window. Time windows are used to be able to give specific reference points (the start of time windows) from which various measurement values can be given. The time windows can be numbered or marked in some other way. The time windows do not need to be adjacent but can be free-standing and be generated with time intervals that are adapted to the calculation capacity of the cells. Possibly an initial sorting of the pulses by frequency and amplitude is carried out to facilitate subsequent transmitter correlation. Thereafter the pulses are sorted into different groups in accordance with an initial approximate measurement of the pulse repetition interval (PRI). The sorted pulses are used for an accurate calculation of PRI. The time of arrival for each pulse relative to the start of a window is successively reduced by the accurately calculated PRI until all times of arrival for all the pulses per group have a value between zero and PRI. An averaging of these times gives a good estimation of the time of arrival position for the first pulse of the pulse train after the start of the window. The estimated time of arrival position is then reduced successively by a reducing value until the reduced time of arrival position assumes a value that is less than the reducing value. The reducing value exceeds the propagation time between two cells in a pair of cells that together are used for bearing measurement. The reduced time of arrival position is sent thereafter, depending upon the application, either to another cell in a pair of cells or to an information centre for determination of the bearing of the radar transmitter in relation to the pair of cells.

The specified aims are also achieved by means of a procedure for data reduction of times of arrival of signals detected by cells. The signals can for example be radar signals. At least one time window with a finite time extent is generated. A time of arrival for a signal detected in the time window is calculated relative to the start of the time window. Thereafter the calculated time of arrival is successively reduced by a reducing value until the calculated time of arrival assumes a value between zero and the reducing value and forms a data-reduced time of arrival. The reducing value is preferably larger than the maximum time of arrival difference that can arise between times of arrival in two cells of a signal that is received by the two cells when they belong to one pair of cells and less than the time extent of one time window. Identity marking of the time window can preferably be carried out upon the generation of the time window. The identity marking is in order that time windows generated in different cells can be associated with each other so that times of arrival, data-reduced times of arrival, from different cells can be correlated. The data-reduced time of arrival from a cell in a pair of cells can be used together with a data-reduced time of arrival from the other cell in the pair of cells in order to calculate a bearing to the place from which the signal originates or is generated. In order to be able to use the data-reduced times of arrival from two cells in a pair of cells to calculate a bearing, the data-reduced times of arrival must be data-reduced times of arrival for the same signal. In order to ensure that the times of arrival are from the same signal, the time windows can be synchronised, for example using identity marking. A characterisation can preferably also be carried out on the received signals. The characterisation can for example be the signal's frequency, amplitude, coding or other properties that the signal has. The characterisation of the signal can be stored/associated together with the signal's data-reduced time of arrival and if necessary also the identity marking of the time window so that the different data-reduced times of arrival from different cells can be compared and if necessary traced back to the same signal/signal source. The data reduction permits a high measurement accuracy in spite of a low information transmission speed.

This invention is characterised by the position determination of electromagnetic transmitters in the radio frequency range such as radar transmitters being carried out in a cheap, efficient and reliable way with sufficient accuracy. This is achieved in accordance with the invention with a number of relatively simple cells situated in an area where the data connection with an information centre is carried Out after an ingenious data reduction utilising the infrastructure for communication already existing in society. The data reduction permits a low information transmission speed which for example has great advantages in connection with sensitivity to interference. A system with a high information transmission speed is more sensitive to interference than a system with a low information transmission speed.

BRIEF DESCRIPTION OF THE DRAWINGS:

In the following the invention will be described in greater detail for the purpose of explanation and in no way for the purpose of restriction, with reference to the attached figures, where.

DETAILED DESCRIPTION

In order to clarify the system in accordance with this invention some examples of its application will be described in the following with reference to FIGS. 1–7.

Figure 1:
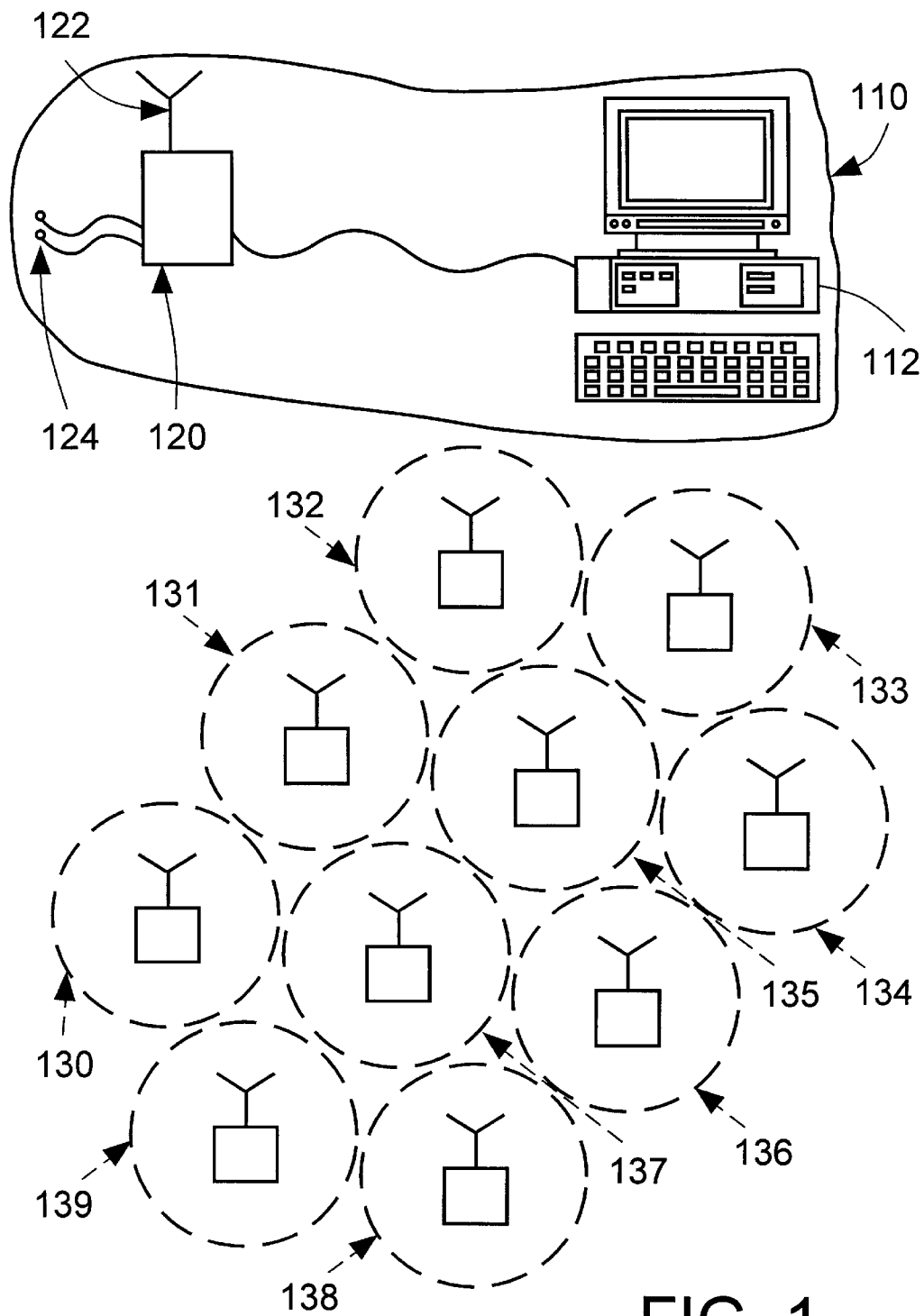
FIG. 1 illustrates a block diagram of the construction of system for determining position in accordance with the invention.

FIG. 1 shows a block diagram of a system for determining position in accordance with this invention. The system includes a central unit 110, the information centre, and a large number of sub units, cells 130–139. The information centre has a data connection to the cells 130–139. The cells 130–139 are located or installed in the geographical area that is to be guarded and/or monitored. Cells that are connected to an information centre and that have some special characteristic, for example are located in a defined area or have a particular design, can be grouped in accordance with one, both or other criteria. This is so that among other things commands can be given easily to a number of cells simultaneously which saves time in the transfer of data between the information centre and cell(s). The arranging of cells in groups also provides a more easily understandable system.

The information centre comprises a data processor 112 that can be a PC or some other computer with program memory and data memory. The computer 112 also comprises an input and output device that for example can consist of a keyboard and a monitor. The information centre is also prepared for external connection communication 120. The liaison/communication 120 can either be wireless via an aerial 122 or via a cable 124 and can be of a type for one-way or a type for two-way communication. If the communication with the cells is wireless this can be via a radio network, for example a mobile telephone network such as GSM or NMT, MOBITEX or direct to the cells. If however the communication takes place via cables this can take place via a telephone network, a general national network or a separate network, and then if necessary via a radio network, for example GSM or NMT or a via cables direct to the cells. By cables is meant both optical and electrical conductive cables. In certain applications it can be appropriate to use other networks that are part of the total defence system. FM transmitters in the country can be used in the same way as in or using the system MINICALL (RDS and equivalent) as a supplement. The first-mentioned medium permits two-way data transfer using for example data/fax modems between a data processor in both the information centre and cell. The medium for one-way communication only permits an exchange of data in one direction. In certain applications of the system or in certain special function phases of the system it can be sufficient only to have one-way communication from the cell to the information centre which is a minimum for the system to able to work in accordance with the invention.

The cells are individually connected to the information centre via the medium for data communication. All the cells have an identity designation—an address/address code—that is unique for each cell. In a corresponding way, in those systems that have divided all or some of the cells into one or more groups, each group of cells connected to one and the same information centre has a particular group identity—a group address/group address code—that is repeated in each cell and is the same for all the cells that belong to the same group. In addition there can also be a system identity—a system address/system address code—that is the same for all the cells that belong to the same system. There can be several systems that are operative at the same time and in order to prevent information and commands going to the wrong place this system identity/system address provides the ability to distinguish between different systems. The address code of the cell and if necessary the group is used for all communication between the information centre and the cell as calling addressees) and for communication between cell and information centre as identifier of the individual cell or group.

Figure 2:
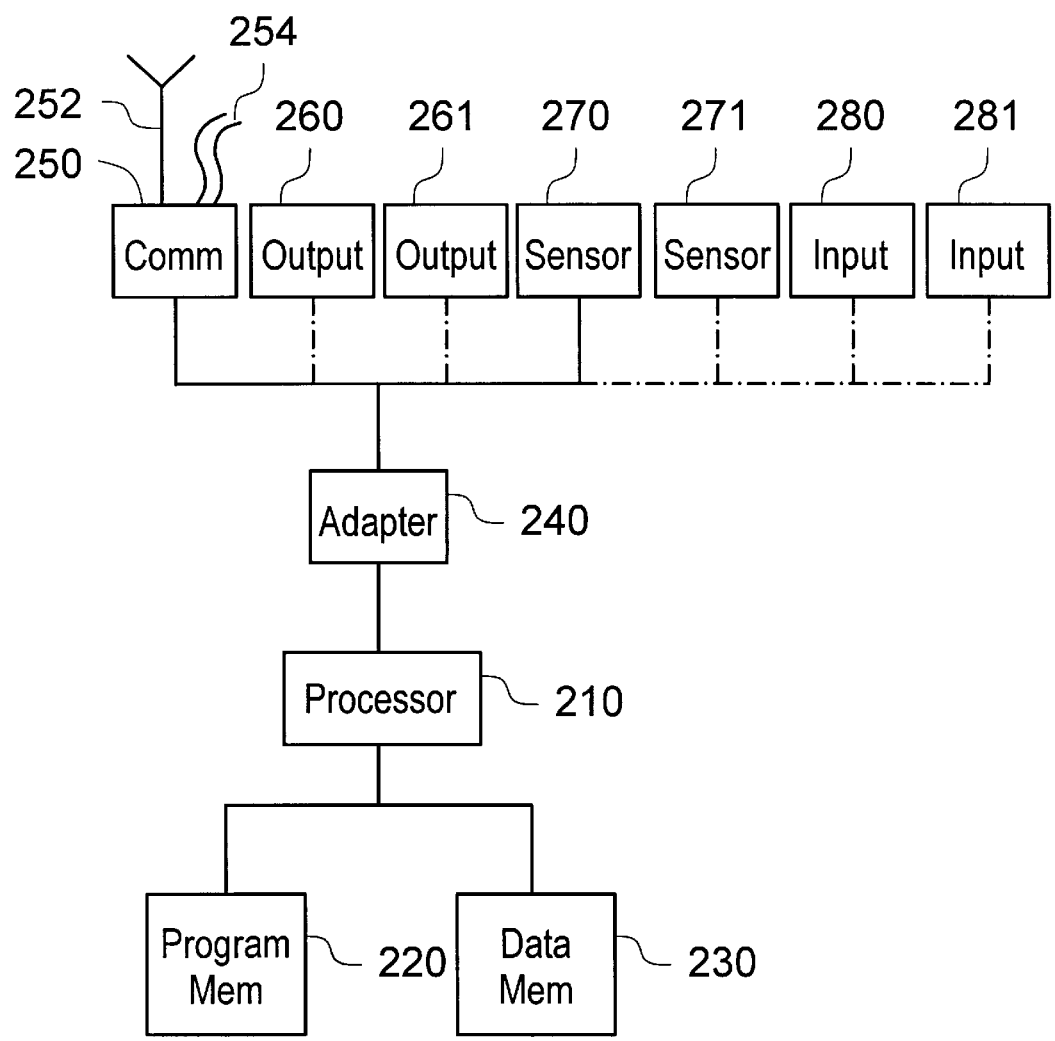
FIG. 2 illustrates a block diagram of an embodiment of a cell in accordance with the invention.
Figure 3:
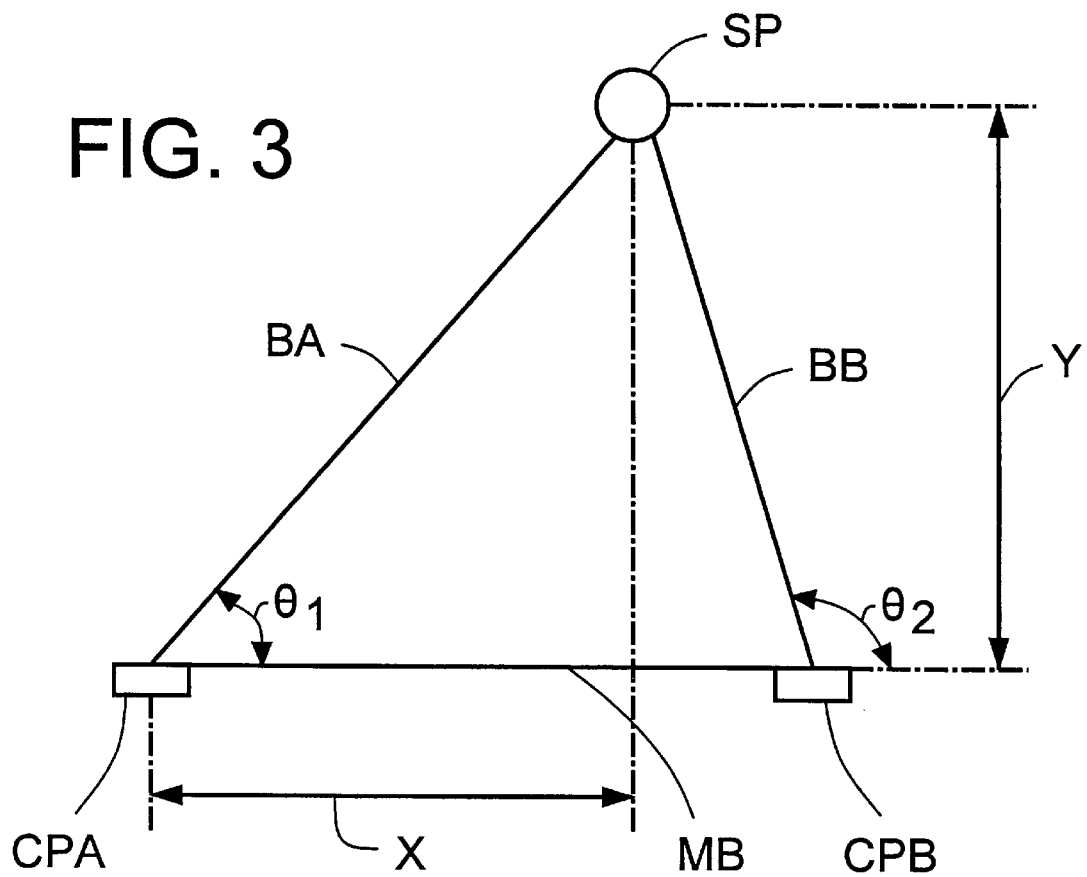
FIG. 3 illustrates how an information centre determines the position of a transmitter.
Figure 4:
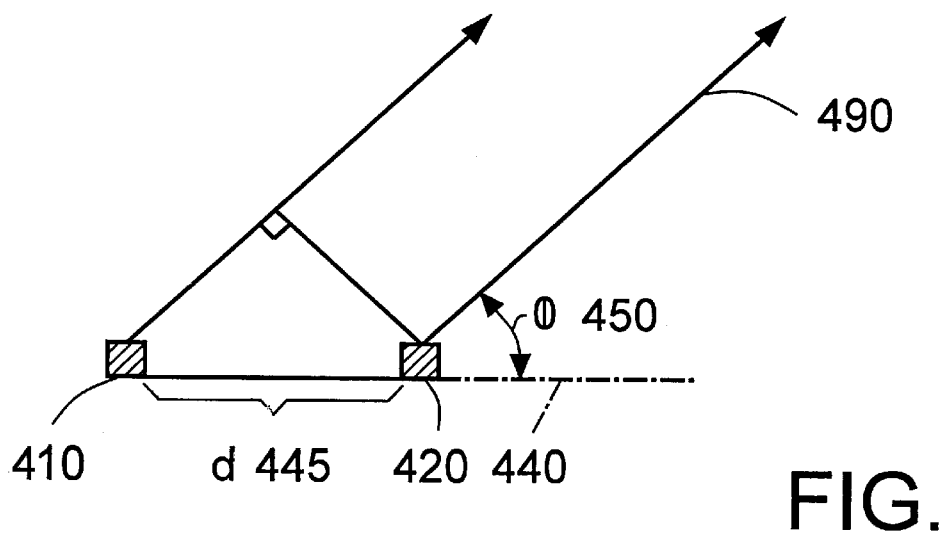
FIG. 4 illustrates how an information centre or possibly a pair of cells determines the bearing of a transmitter.

FIG. 2 shows a block diagram of a design of a cell. Each cell is provided with one or more sensors 270, 271, that are intended to detect electromagnetic signals within for example the radio frequency range. The sensors can for example be receivers with amplifiers and associated aerials with for example a 60° beam horizontally and approx. 10° vertically for the appropriate frequency band. The receivers can be adjustable to various required frequency bands, for example 8–14 GHz and 8–10 GHz. If a better horizontal cover is required the cell can be provided with an aerial with wider horizontal beam or can use several aerials/amplifiers and possibly permit the channel with the momentarily strongest signal to be forwarded into the processing chain.

Each cell also includes a control computer that comprises a processing device 210 with program memory 220 and data memory 230 to ensure that the cell can operate autonomously. The program memory 220 can contain programs for basic functions in the cell such as communication and in addition one or more function programs that define how the cell will interact with the outside world using criteria and various parameters. In those cases where the program memory contains several function programs the choice between these can be carried out for example either before the cell is put in position, by time control or by commands transmitted via the communication with the information centre. There can also be room and the facility to add on further function programs in the program memory (i.e. that the program memory is (re)programmable) which can be carried out via the communication from the information centre. This makes it possible to change the aim of the cell or improve the tasks that the cell is given. The cell's response to signals with certain required characteristics within the respective sensors' area of sensitivity is determined autonomously within the cell from a set of criteria and parameters that are laid down in advance or sent via the data communication in order to achieve the intended function.

Associated with the cell's processor device 210 is also an adaption device 240 that adapt signals to and from the processor device 210 and a communication device 250 and from at least one sensor 270. If necessary there is also one or more output devices 260, 261 and if necessary as well as the sensor device(s) 270, 271, a further one or more input devices 280, 281 with which the processor device 210 communicates via the adaptment device 240.

The communication device 250 can be of a type for one-way communication, a type for two-way communication or a combination of the two. The method of communication can be either wireless via an aerial 252 to a radio network, for example GSM or NMT, or direct to an information centre or via a cable 254 to a general or separate telephone network or direct to an information centre. The one or more output devices, 260, 261 can in their simplest form consist of an electrical signal that in turn controls an external device of some kind. One use for the extra output and input devices 260, 261, 280, 281 is as a medium for one-way or two-way communication for clock synchronisation between two cells in a pair of cells, see below. Output devices can also consist of electromagnetic jammers.

The system is designed in such a way that the cells can be located for example in an area of land or in/on buoys at sea with great f reedom in the choice of location. This freedom is possible because the power supply can be from batteries and/or solar cells and because the communication can be made with wireless data transfer. If the information centre is to be handled by an operator, the information centre can be situated indoors at a location from which it is possible to communicate with the cells. The number of cells belonging to a group allocated to an information centre can be easily adapted for a particular task as can the number of groups belonging to one and the same information centre.

In order to facilitate free location of cells in the field it is important that the need for electrical power for electrical or electronic equipment in the cell is minimised. One method can be to reduce the power consumption during periods of time such as those occasions when the cell is not fulfilling an acute need, which presupposes that the active use is only sporadic. With communication from information centre to cell, the cell can be ordered to shut off all the items consuming power with the exception of a receiver, for example the ordinary receiver, an extra receiver of the type MINICALL or a timer that is either used to power up the whole cell or only to start up a limited work mode in the cell such as a function control. For energy saving in the cells it can thus in certain cases be advantageous to supplement a two-way communication with a one-way communication from the information centre to the cell, where the one-way communication is used for activating and inactivating the rest of the cell including the ordinary two-way communication. The cell can therefore be provided with power by a battery and/or solar cells with a capacity calculated only for the periods when the cell is expected to be active.

Another advantage is that when the cell is in a mode that only has a receiver powered up, for example an extra receiver, it cannot be located by emitted radiation or other activity that can reveal its existence. The system can also take advantage of the one-way coommunication between an information centre and cell for the selection of the signal profile among a number pre-pregrammed into the cell's program memory that in a certain situation will be recognised by the cell or whose characteristics with a small number of parameters can be transmitted to this memory for signal identification. For this a one-way communication is sufficient and appropriate in those situations where you do not want to reveal the existence of the cell or its position, provided for example no acknowledgements of commands are required.

The signal profile can consist, when the electromagnetic signals are radar signals, of one or more of the following parameters by which radar signals from a radar transmitter can be characterised: frequency, pulse length, coding or pulse repetition frequency. It can be mentioned here briefly that the following examples mainly describe embodiments and methods according to this invention that are appropriate when the electromagnetic signals are radar signals and the objects consist of radar transmitters of some kind. These examples are only suitable embodiments and methods concerning the invention for the purpose of explanation and are not in any way for the purpose of restriction or limitation. When the cells are commanded to operate in an active mode via for example the one-way communicaion rmation centre, the cells that are "illuminated" by the main beam of a radar transmitter can be activated in accordance with certain criteria that for example include the signal profile. Activation of the cell can mean that the cell synchronises its clock if it is part of a pair of cells and that it measures a time of arrival (TOA) and identifies a received signal, information that is thereafter transmitted to the information centre.

Thereby an information centre can activate and deactivate one or more cells and/or one or more groups of cells and transmit signal profiles and criteria that define in what way individual cells or groups of cells are to operate in the event of "illumination" by radar signals from a radar transmitter. The function can be anything from the cell activating the measuring of the time of arrival as soon as it is "illuminated"

by a radar signal to the cell only activating measuring and transmitting the time of arrival for a specific radar signal from one or more radar transmitters.

It is important for a practical implementation of the invention that existing, nation-wide infrastructure can be used for data communication between the information centre and the cells. The system in accordance with the invention requires as mentioned at least one data communiction between the cells and the information centre to be set up. An important characteristic of the invention is that it is adequate for the rate of data transfer between the information centre and the cells and vice versa to be low and not in real-time. This makes possible the use of a two-way connection between the information centre and cells using mobile telephones and mobile telephone networks for example of the type NMT or GSM. With the use of two-way communication utilizing some mobile telephone network this two-way communication can be supplemented by a one-way communication of the type MINICALL between the information centre and cell in those cases where it is not wished to reveal the position of the cells or even their existence (even if the information is only sent in one direction in a mobile telephone network there is a continual two-way data/synchronisation exchange in a mobile telephone network that could thereby reveal the cell). It should be pointed out that although the following examples use two-way communication, in most of the examples it would be sufficient to have one-way communication from the cell to the information centre to provide the required function.

Using cross-bearing the system calculates in an information centre the position of a detected and identified transmitter, and if necessary the calculation can be carried out by several information centres working together. A compilation in an information centre of several calculated positions makes up the basic data that can be processed in such a way that the transmitter's movements can be followed and predicted (manually and/or automatically using computers).

For cross-bearing an information centre uses information from its sub units, that is to say cells connected to the information centre and if necessary also other information centres and cells in the event of several information centres working together. The information can consist of the identity of the cell, the characteristics of the detected transmitter such as frequency, sender mode in accordance with the cell's identification, pulse length, pulse repetition interval, time of arrival and identity number for the particular measurement window/time window (see below).

Cross-bearing is calculated based on at least two bearings that are identified as belonging to the same transmitter. A first bearing BA, see FIG. 3, calculated from information from a first pair of cells/sensors CPA and a second bearing BB calculated from information from a second pair of cells/sensors CPB are used to calculate a target transmitter's position SP. The information centre has appropriate geographical map data stored and at least all the geographical positions for the cells/pairs of cells that belong to the information centre. The information centre does not need information stored in advance concerning the geographical position of cells/pairs of cells that have a device for position determination, for example GPS, as these cells/pairs of cells can communicate their relevant geographical positions to the information centre. The measurement base MB is either stored or can be simply calculated in the information centre, The X- and Y-co-ordinates for the transmitter's position SP relative to the first pair of cells/sensors CPA can be calculated by for example the following equations:

$$X = MB \cdot \cos(\theta_1) \cdot \frac{\sin(\theta_2)}{\sin(\theta_2 - \theta_1)}$$

$$Y = MB \cdot \sin(\theta_1) \cdot \frac{\sin(\theta_2)}{\sin(\theta_2 - \theta_1)}$$

where $\theta_1$ is an angle anticlockwise from the measurement base MB to the first bearing BA from the first pair of cells/sensors CPA and where $\theta_2$ is an angle anticlockwise from an extension of the measurement base MB to the second bearing BB from the second pair of cells/sensors CPB.

The bearing measurement is carried out preferably in accordance with the Differential Time of Arrival (DTOA) principle, that is to say that the difference in a transmitter signal's time of arrival (TOA) to two cells/sensors is measured. One of the advantages of using the Differential Time of Arrival method is that in accordance with the invention it is possible to implement it in simple sub units with moderate requirements of clock synchronisation between the sub units. Calculation of bearings can take place in the information centre in order to be able to keep the cells, the sub units of the information centre, simple, as there are a large number of these to each information centre. With a difference in time of arrival of a transmitter signal to two cells 410, 420, see FIG. 4, equal to t the angle φ 450 between the bearing 490 of the detected transmitter and the extended connection line 440 between the cells or sensors can be calculated as:

$$\phi = arc \cos(ct/d)$$

where c is equal to the speed of light and d 445 is equal to the distance between the cells/sensors.

Figure 5:
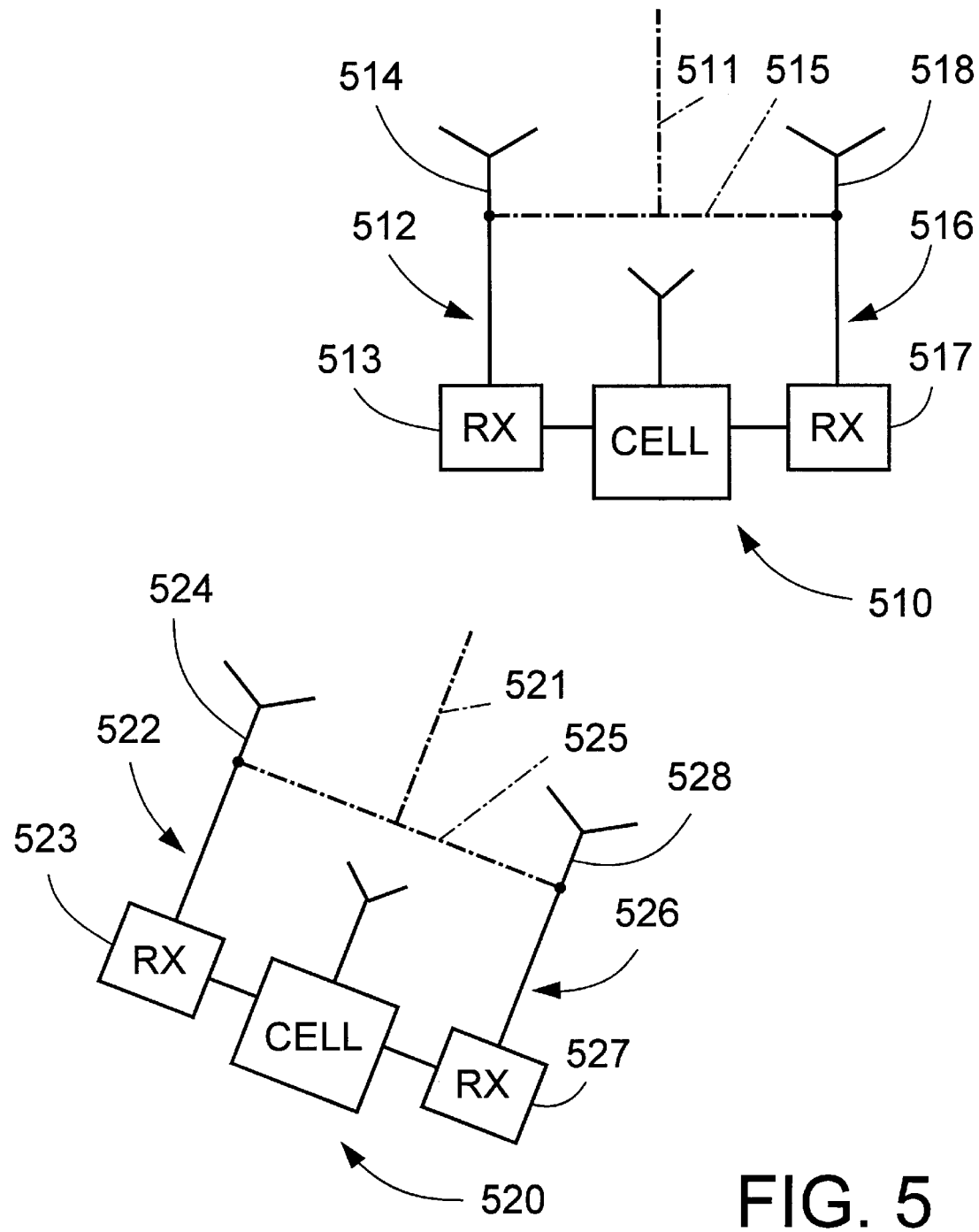
FIG. 5 illustrates an embodiment of a cell in accordance with the invention for determining bearings.

The measurement of time of arrival can be carried out in different ways where a first example of the invention is that, with reference to FIG. 5, a number of cells 510, 520, that for example can make up a group, are provided with sensors 512, 516, 522, 526 in the form of receivers that can detect and possibly identify radar or radio transmitters. The cells 510, 520 can determine the difference in time of arrival to the respective sensors of a signal from a transmitter and forward this information to an information centre for calculation of the position of the transmitter.

In order to increase the accuracy in determining the direction the cells should preferably contain an internal precision clock that can be synchronised with an external time reference. The synchronisation can be carried out via a group-addressed or system-addressed synchronisation code from the information centre using the ordinary data communication. The cells can also be provided with separate receivers for some external time reference such as for example DCF-77 from Frankfurt in Germany, Swedish Radio's time signal or some other time reference transmitted by radio. The synchronisation signals that are included in TV signals (line and image synchronisation) can also be used. In the latter cases these cells can also each have been provided with radio/TV receivers for direct reception of the transmitted reference that is connected to a device that automatically precision-synchronises the cell's clock to the time reference/time signal. The reception of the time reference/time signal can either take place continually or only at particular times. The choice of reference is among other things dependent upon what absolute and relative time accuracy is required in the particular application.

With at least two receivers 513, 517, 523, 527 in each cell and receiver aerials 514, 518, 524, 528 belonging to the respective receivers, time of arrival differences of detected and possibly also of identified signals from a transmitting radar or radio transmitter are determined in the respective Cells. The aerials must be located at a fixed precisely-known distance from each other and in a position so that the geographical direction of the perpendicular 511, 521 to the line (the base line) 515, 525 between them is known (by for example the use of GPS or some other method of measuring).

In the case of DTOA measurement (bearing measurement) the length of the measurement base can preferably be long, such as kilometres instead of fractions of meters for measuring in relation to an X-band transmitter (10 GHz range) as this does not require an equally high time resolution. There is no reason to try to attain a shorter measurement base while retaining accuracy in the measurement of bearings by means of high measuring precision and thereby complicated cells.

One reason for not having a system with a very high time resolution is that the time measurements that are to be sent to the information centre for the calculation of the bearing/position would require a correspondingly higher data rate. This means that in accordance with a preferred embodiment of the invention a pair of cells can be used comprising two sub units/cells located at a distance from each other and with at least their own aerial and receiver. The times of arrival (TOA) of a signal from a transmitter to these respective cells is later compared for calculating the bearing. In order to be able to compare the times of arrival to the two cells in a pair of cells, the cells must have synchronised clocks. The use of a long measurement base requires less accuracy in the clock synchronisation between the cells in a pair of cells than is required with a short measurement base which makes possible the use of simple cells.

Figure 6:
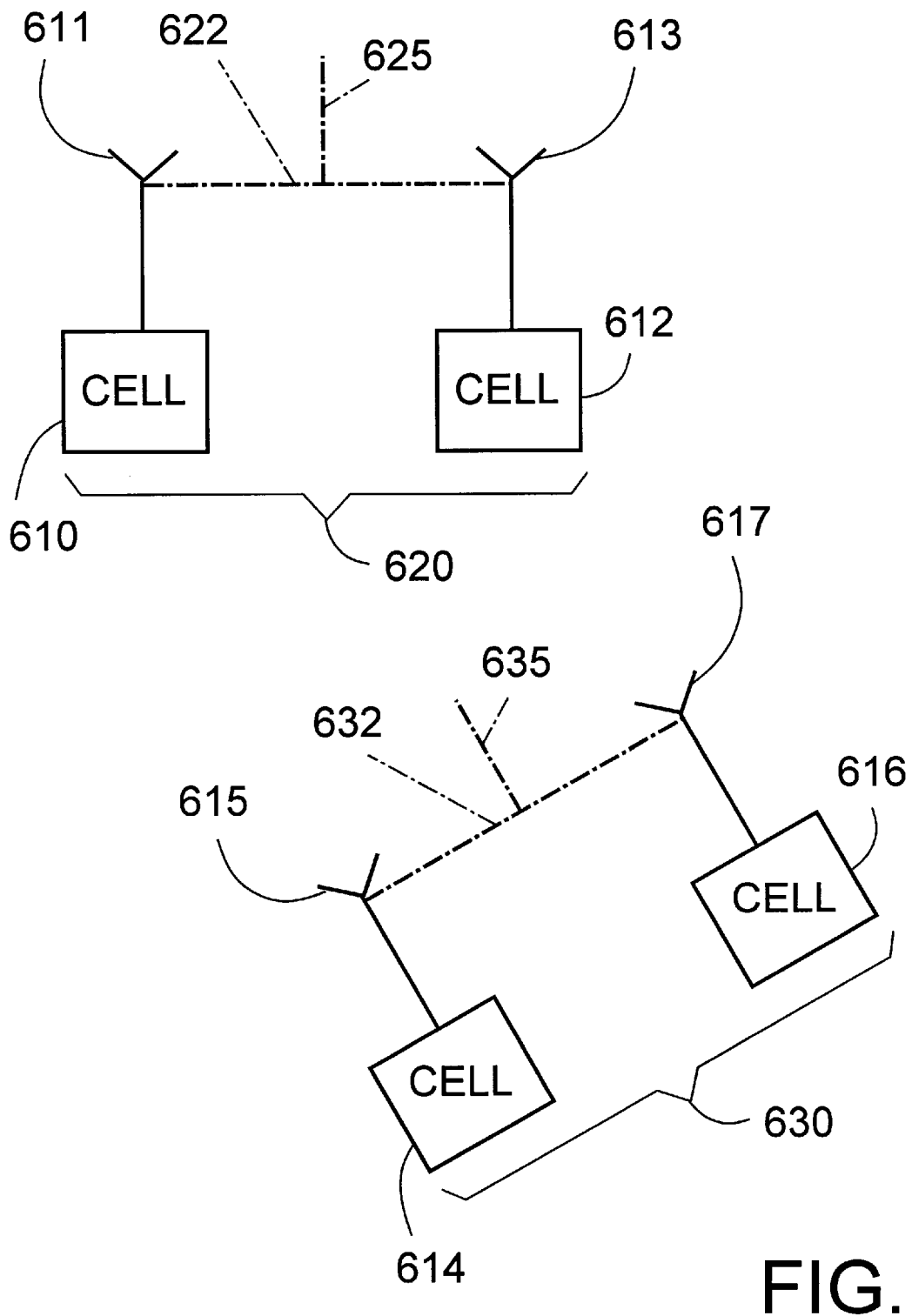
FIG. 6 illustrates a preferred embodiment of a pair of cells in accordance with the invention for determining bearings.

FIG. 6 shows how four cells 610, 612, 614, 616 in two pairs of cells 620, 630 are located in such a way that they each define a measurement base 622, 632 with perpendiculars 625, 635 pointing in an appropriate measurement direction horizontally. The cells' receiver aerials 611, 613, 615, 617 are to point in directions that are approximately parallel to the direction of the respective perpendiculars 625, 635. The distance between the cells' receiver aerials (the length of the measurement base) can preferably be between 200 and 3000 meters For its evaluation of data from the cells the information centre will select cells within its measurement area where the target/transmitter is situated relatively close to the perpendicular to the respective measurement base in order to achieve the best measurement accuracy.

Leading edges of received pulses are determined with as good precision as a simple equipment permits. For example a point 6 dB below the amplitude of the pulse (the amplitude is equal to an average value of a number of samples from that part of the pulse where the pulse levels out immediately after the leading edge) is selected as the definition point for the time position of the leading edge. The signal is sampled (analog to digital conversion) at let us say 20–50 nanoseconds intervals for subsequent digital signal processing. The position of the leading edge in accordance with this definition can be interpolated from a number of samples from the leading edge of the pulses.

The position determination system according to the invention is designed in such a way that the receiver cells are organised in pairs that have a certain distance between the cells and are oriented in such a way that during part of a scan from, for example, a scanning aircraft radar they will both simultaneously be included in the radar's main beam (the beam angle has here been considered to be approx. 3°). The distance between the pair of cells can be in turn of the order of 50 kilometers. The position determination should involve a number of pairs of cells. The geographical location of the cells must be able to be specified precisely on a map in order for the orientation of the measurement bases to be well known in relation to geographical north.

In order to retain the concept of simple cells, data communication directly between the cells is avoided and preferably also between cells in a pair. However, a common time base must be introduced in some way, both between the cells in a pair and between the pairs. The requirement for time resolution is considerably different in both cases.

The DTOR method assumes that the time of arrival of the pulses can be referred to the same time base within a pair of cells/sensors. The following calculation gives an idea of the requirements for time synchronisation and the measurement accuracy that are required. An error in the time synchronisation between the cells in a pair of cells of 33 nanoseconds corresponds to a difference in propagation distance of 10 meters. If the measurement base is 2000 meters and the transmitter is located on the perpendicular to the midpoint of the measurement base, this means that the transmitter is thereby indicated at arcsin $(10/2000)° = 0.29°$ error; 100 nanoseconds corresponds to approx. $0.9°$ error in bearing. The effect of the height of the transmitter above the cells on the propagation times has a negligible effect on the measurement result at the distances that are being discussed here.

Several different methods can be used to synchronise the clocks in the individual cells in a pair of cells, some of which have already been mentioned. One of several satellite-based systems is the GPS system that is able to provide an absolute accuracy of 50–75 ns. GPS receivers are cheap as they are produced in large numbers and are available in integrated circuit technology. Cells that use the GPS system can be mobile/movable as the GPS system is primarily designed for determining position. Information about the position of the cell can in such cases be transmitted to its controlling information centre that uses the position of the cell in order to calculate the bearing and original position of detected signals. The accuracy of the position determination in accordance with the GPS system can be increased by for example using differential GPS (D-GPS). The only internal connection that is required in a system concept with GPS as the time base is a connection with a low data rate between cells and information centre. In spite of the advantages of using GPS, several suitable methods will be presented as the reliability of a GPS system cannot always be guaranteed and the GPS signals are subject to interference which cannot be accepted in all situations.

Two alternative but principally similar solutions for achieving a common time base with adequate precision within a pair of cells are transferring synchronising pulses/clock frequency using optical fibres between cells in a pair of cells or sending corresponding signals via a carrier wave that is adapted to the cell's receiver band (for example the X-or S-band). A clock, an oscillator with a quartz crystal with moderate stability, can be used jointly for the cells in a pair. A clock-related 50–100 MRz signal is sent in an optical fibre from one cell, the master, to the other cell in the pair, the slave. The signal can alternatively be sent as a 50–100 MHz modulation from let us say a 10 GHZ low power transmitter with a simple directional aerial located in the master cell directed towards the slave cell.

In both cases a phase-locked loop with restricted band width is used in order to lock the slave cell's clock to the master cell's clock. The reference sent from the master cell must be coded in such a way that both cells can be synchronised so that they can identify the same clock cycle after correction for propagation time of the synchronisation signal. The system should also be able to handle restarts after interruptions while fulfilling this requirement.

It is not necessary for the cells' clocks to be synchronised continually. It is sufficient for the slave clock to be synchronised with the master clock when the cells register an interesting signal (within milliseconds after the detection). The slave cell's time can then be corrected with regard to the adjustment that this new synchronisation involves if both the cells' clocks are sufficiently stable in the short term. The valve of the time correction that the clock adjustment involves is recorded. The time correction is measured using a second equivalent clock in the slave cell. The valve of the correction is used to correct the times of arrival for a transmitter signal that has just been registered or is being registered in the slave cell. Even if the adjustment to the time is in this connection a large amount when a long time has passed between synchronisations, the momentary clock rates in the master cell and slave cell are very similar. Over for example a period of time of less than one second the deviation is normally less than ten nanoseconds with a moderately accurate and initially synchronised quartz clock (for example with the stability 1 part per $10^8$ per hour, 1 part per $10^7$ per year).

In a system using optical fibres for time synchronisation there is hardly any reason to use other than continuous locking between the clocks. It is also possible to use only one clock that is shared by both cells. The propagation time for the clock signal between a pair must be able to be determined and stored in for example the information centre in order for the condition "common time" to be fulfilled in the calculation of bearings. The signal in a suitable optical fibre has a propagation time that is linear with the length and has a linear temperature-dependency of a size that is negligible in this case. A suitable type of optical fibre can for example have a time difference in propagation time of 5.5 ns over a temperature range of 100° over a fibre length of 1 km and a propagation time at a temperature of 0° of approx. 5 $\mu$s. If a microwave transmitter is used the propagation time delay in free space at ground-level atmosphere is calculated from the length of the base line and can be controlled by the transmitter sending a signal with a pulse form and a carrier frequency that has been recorded in the library as "interesting transmitter".

If a fibre or wireless communication with a high data transmission capacity is set up between master and slave cell in the system the pair of cells can work more autonomously. This means that the slave cell transmits times of arrival to the master cell where data concerning time can be processed for a bearing determination. In this system solution only bearing data and for example the transmitter identity is sent from the master cell to the information centre. In this configuration the slave cell has no need of a connection with the information centre for the reporting of data.

The calibration of a pair of receivers takes place similarly to the method that is used for measuring in relation to a target. One cell sends a well-defined pulse train concerning pulse length and pulse repetition frequency as a synchronisation signal in the direction of the other cell. This receives the pulse train and adjusts and phase locks its clock based on the detected synchronisation signal. In order to achieve the correct common time a correction is made for the propagation time of the signal between the two cells. This correction can be carried out within the pair of cells or alternatively in the information centre as the centre knows the positions of the cells. The size of the correction is determined by the distance between the cells. By measurement being carried out in relation to a well-defined signal the measurement accuracy will be better than by measurement in relation to an actual target. After calibration the calibration error can consequently be neglected.

The fact that the cells are part of a pair of cells means that they are located in suitable positions in relation to each other and to expected target paths. Being part of a pair of cells also involves the two cells in the pair of cells specifying times of arrival (TOA) to the information centre in a time-based system that is common to both cells with the time resolution that is needed for the calculation of bearings with the required accuracy. The synchronisation of time with other pairs of cells can be of considerably lower precision as the time here is only used to determine whether respective measurements reasonably refer to the same sweep from one and the same transmitter (the rotational speed for a nose radar's sweep in search mode is between 50° and 360° per second, for a flying reconnaissance radar with rotodome around 30° per second).

In order to be able to utilise a data communication with a low transfer rate between cells and an information centre, the information that is to be transferred from the cells must be reduced so that the quantity of information to be transferred to an information centre can be carried out within a given period of time. According to the invention this data reduction takes place in each cell using synchronised time windows of a certain fixed length during which measurement time, measurement windows, the detected pulse trains are characterised. The synchronised time windows can lie directly after each other edge to edge or can be separated in time depending for example upon the characteristics of the received signals and/or the calculation capacity of the cells. The leading edges of the pulses are detected and time-marked in the cells so that it is possible to determine the PRF of the pulse train. Thereafter a measurement of the time of arrival of the pulse train is determined. The concept according to the invention utilises signals from transmitters that have PRFs that are constant during the measurement times involved here. Modern radar systems generally have this characteristic. Unlike the arrival time of the individual pulse, the arrival time of the pulse train is determined by a method that, if the pulse train's PRF is sufficiently high in relation to the length of the time window/measurement window, utilises an average value over a large number of pulses. The time of arrival for the pulse train in the time window/measurement window is calculated in accordance with a Modulo formula. By this method the pulse train's PRF and its time of arrival can be determined even if some pulses in the pulse train happen to avoid detection for some reason. Two or more pulse trains that are detected at the same time in a time window/measurement window can, whether or not they are detected without loss of pulses, be handled separately if the pulse trains can be sorted out sufficiently well for the different PRFs to be determined. The procedure for determining the time of arrival in the time window/measurement window is repeated in the same way for each sorted-out pulse train separately.

As the data communication between cell and information centre includes a variable and unknown time delay, within a known longest time frame, the data that is calculated from detecting the pulses within a time window must have added to it information (data) that states the identity of the time window, namely a window time number. Using the window time number, measurements and data from different cells belonging to the same measurement base and corresponding time windows can be coordinated in the information centre for comparison of among other things the .times of arrival of the transmitter signals in accordance with the abovementioned calculations. Time windows with the same window time number mean that they have the same absolute time within a tolerance that depends upon the time synchronisation of the cells. The window time numbers can be reused cyclically on the condition that the numbers do not recur within the time frame that can occur in the data communication via the communication network concerned.

The invention compresses/reduces the number of digit values to a minimum so that among other things the capacity of a mobile telephone service is sufficient for the data communication with an information centre. By the use of a low data transmission speed a system is also obtained that is resistant to interference. Information about a detected transmitter that is accumulated during a time window period should be able to be delivered to an information centre during a time window period otherwise information will permanently accumulate in the cells. AS an example we assume that the time windows are four milliseconds and that data can need to be buffered for a period of at most a half second. The number of bits that each cell needs to transfer to an information centre is estimated to be seven bits for transmitter type (including PRI information), ten bits for the time position (resolution 10 ns) and seven bits for the window time number (resolution four milliseconds and a buffer time of a half second). There is thus a transfer requirement from each cell to the information centre of 24 bits per four milliseconds corresponding to 6 kbit per second. This is within the available transmission capacity of the mobile telephone network.

Figure 7:
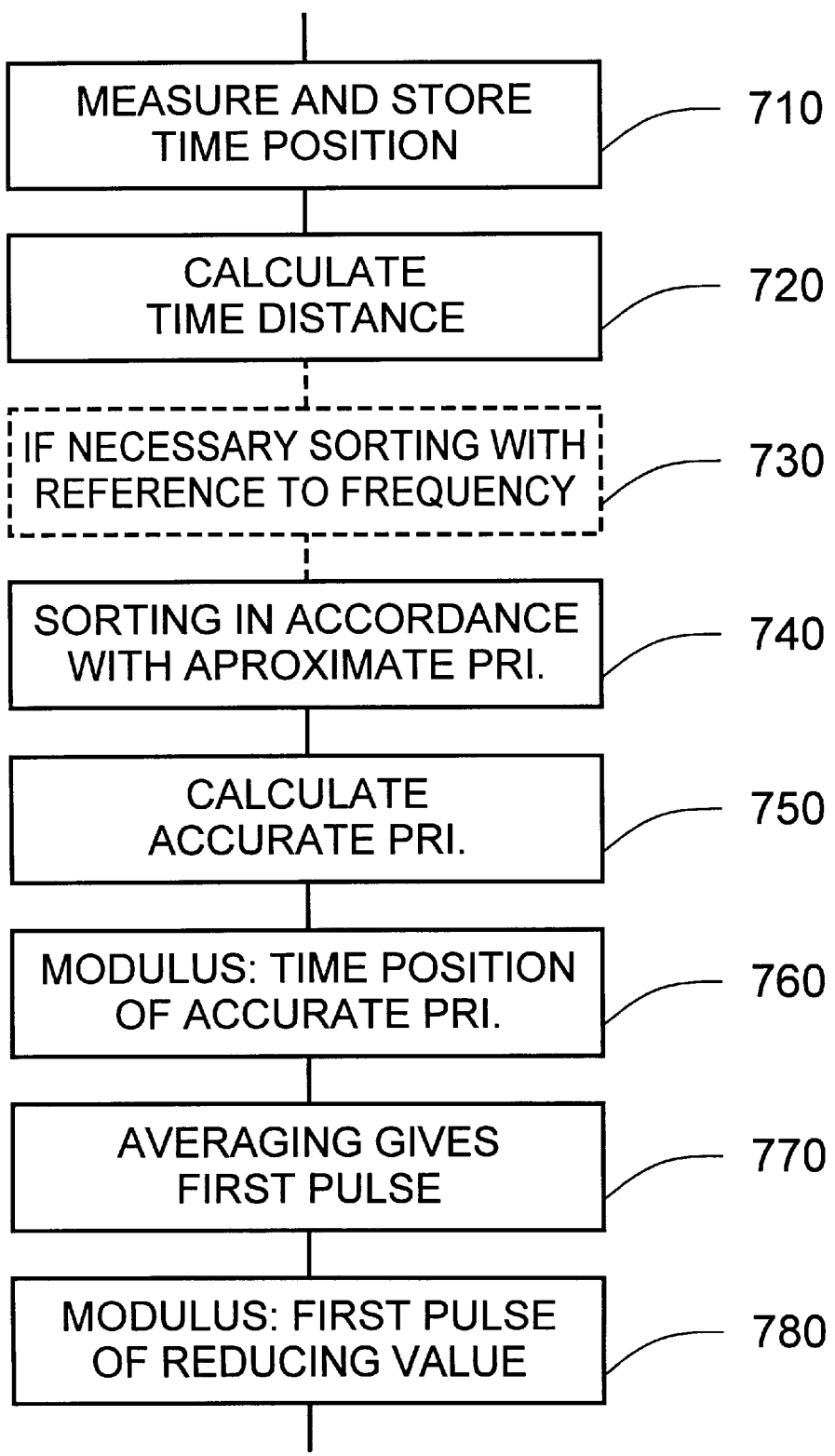
FIG. 7 illustrates a flow chart for determining time of arrival in a cell in accordance with the invention.
Figure 8:
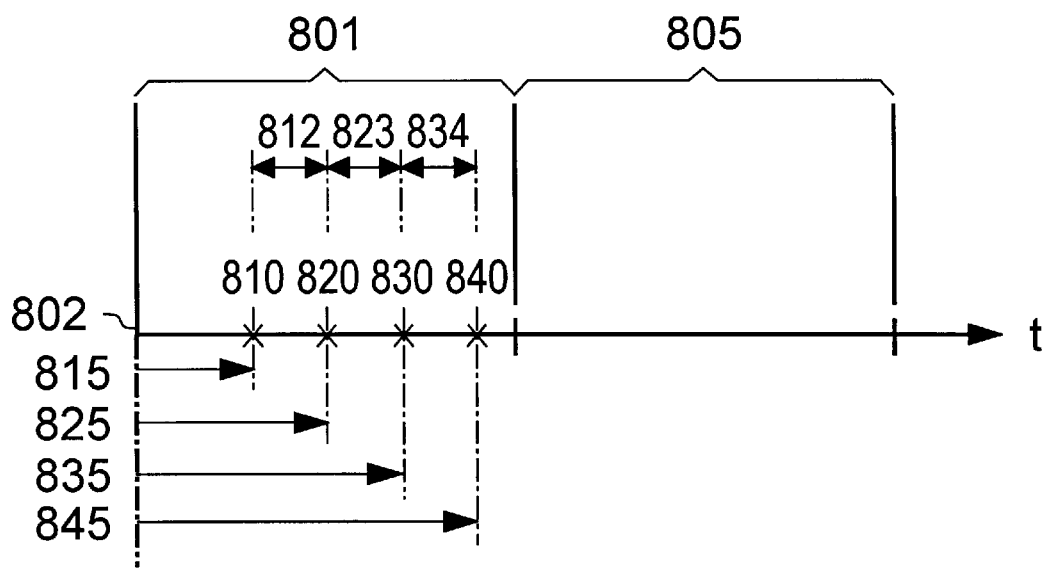
FIG. 8 illustrates time windows in accordance with the invention.

FIG. 7 shows a flow diagram of how the determination of the time of arrival of a pulse train can be carried out in the cells. The description of the flow chart in accordance with FIG. 7 is carried out in association with FIG. 8 that shows time windows 801, 805 with some individual pulses 810, 820, 830, 840 in one of the time windows 801. The reference numbers for FIG. 7 have 700 numbers and the reference numbers for FIG. 8 have 800 numbers. In a first step 710 the time position 815, 825, 835, 845 is measured and stored for the leading edges of the individual pulses 810, 820, 830, 840 in a time window 801 relative to a time window start 802 corresponding to the time window 801. Thereafter, in a second step 720 the time distance 812, 823, 834 between pulses is determined. Possibly there is an initial preliminary sorting of the pulses with regard to frequency and amplitude in a third step 730. A fourth step 740 sorts the pulses into groups in accordance with an initial approximate measurement of the pulse repetition interval (PRI), that is to say that a group is characterised by the time distance 812, 823, 834 between the pulses determined in the second step 720. Pulses that originate from different pulse trains therefore end up in different groups. A certain pulse could happen to have such time position that the pulse fulfils the condition for several groups. In such an exceptional case it is considered to belong to the group of pulses that has the most pulses. After sorting into groups the PRI is determined with a high precision based on the time of arrival 815, 825, 835, 845 of the pulses (within a group) in a fifth step 750. This can be carried out in various ways. As an example, differences in times of arrival can be formed for pulses with a distance between them that is equal to half the time extent for the whole of the measured pulse train. The number of differences is thus half of the number of participating pulses, and each pulse participates in only one difference formation. Taking the average value of the measurement results gives an accurate value of the PRI.

Thereafter in a sixth step 760 the time position for each pulse relative to the start of the window is reduced successively by the calculated PRI until a value between zero and PRI (modulus calculation) is obtained. Each pulse gives in this way a time position between zero and PRI.

Thereafter in a seventh step 770 an average is calculated of these times between zero and PRI. By means of this procedure a good calculated estimate is obtained of the time position for the first pulse of the pulse train after the start of the window without this pulse necessarily needing to have been detected. The time value (TOA) obtained in the seventh step 770 is reduced successively in an eighth step 780 by a reducing value until a value between 0 and the reducing value is obtained (modulus calculation). Thereby only one time value (a data-reduced TOA) not greater than the reducing value needs to be transferred to the information centre. The data-reduced time of arrival is used in the information centre together with a correlated data-reduced time of arrival from the other cell in the pair of cells to which the cell belongs to calculate a bearing value in accordance with for example previously described methods. The reducing value is a time value that is greater than the propagation time difference for the received signals between the two cells in a pair of cells. As an example the reducing value can be 10 us with a measurement base of 1000 meters between the cells in a pair of cells. The procedure using a reducing value is justified by the fact that the difference in the times of arrival for both the cells in a pair of cells amounts to a maximum of 6 $\mu$s (±3 $\mu$s) with a measurement base between the cells of 1000 meters (with a time delay of 3 ns per meter the maximum propagation time between the cells is 3 ns * 1000=3 ps). In this way the requirement for transfer capacity is reduced. On the other hand there can be a certain risk that signal correlation will take place in the information centre between signals from different transmitters. This risk is however judged to be small, and can if required be further reduced if the modulus calculation in accordance with the abovementioned eighth step 780 takes place with a larger reducing value such as for example 100 $\mu$s instead of 10 $\mu$s. The information centre rejects, if necessary, the longer propagation time differences, for example all propagation time differences that correspond to a bearing of more than 60° relative to the measurement base in the pair of cells, in order to reduce problems concerning ambiguity of the result.

In the following the said procedure/method is described in a more mathematical form. When a transmitter signal is detected there is first determined the value of PRI (the distance between the pulses in the pulse train). In the normally occurring wave forms MPD (medium -prf-pulse doppler) or HPD (high-prf-pulse doppler) there are a large number of pulses with constant pulse distances between them during a window time of for example four milliseconds. The quantity m pulses is used for the calculation, where m is the number of pulses with constant PRI in the window. For example m can be maximised to 100 pulses in order to reduce the calculation burden of the individual cells. This would mean that all information is not used for the wave form EPD where 100 pulses have a typical time extent of a half to one millisecond. The time between the leading edge of the pulse and the start of the window is measured. PRI is calculated thereafter in accordance with the following:

$$T = \sum_{i=1}^{m} \frac{(MOD(t_{(i)}, PRI))}{m}$$

where t(i) is the time position for pulse number i relative to the start of the window and m is the number of pulses used. Thereafter the distance (T) is estimated from the start of the window to the first pulse within the pulse group as follows:

$$PRI = \sum_{i=1}^{m/2} \frac{(t_{(i+m/2)} - t_{(i)})}{(m/2)^2}$$

T can thus have a value between 0 and PRI In order to reduce the need for the number of bits in the description of T, t is calculated for each cell as follows:

$$t = MOD(T,R)$$

where R is a reducing value that exceeds the propagation time between two cells in a pair of cells that are used together for measuring bearing. R can for example be 10 μs for a measurement base of 1000 metres between cells in a pair of cells. This means that each cell has to be able to supply a time t. A suitable resolution can for example be 10 ns, corresponding to 10 bits. In the subsequent bearing determination the difference of the calculated t-value from both cells is included. This difference does not exceed ±3 μs, for a measurement base of 1000 meters between cells in a pair of cells, which is the justification for the simplification in accordance with the last equation. For calculating the bearing in the information centre a $t_{DTOA}$ is used as follows:

$$t_{DTOA} = t_1 - t_2$$

where $t_1$ and $t_2$ are the time positions (data-reduced times of arrival) for each cell in a pair of cells. The bearing can thereafter be calculated in the way that was previously demonstrated in connection with FIG. 4.

In the information centre the information is collected from all the cells belonging to that information centre. The information includes time corrections as mentioned above that comprise propagation times for clock signals between cells in a pair of cells and measured time deviations in the event of any adjustment of a slave cell's clock. The criterion for both cells in a pair of cells being assumed to have detected the same transmitter in the event of an overlapping scan is that the same identity code (transmitter/transmitter mode in accordance with the cell's identification, PRI, pulse length and additional characteristics) within a measurement window has been reported from both the cells. Reports from cells include information about the identity of the transmitting cell, the identity code of the detected transmitter, time of arrival (TOA) and window time number for the relevant measurement window within the permitted buffer time.

Geographical map data is stored in the information centre in addition to all the positions of cells that belong to the information centre. The information centre examines the information and measurement results from the cells concerning interesting transmitters. It is decided which time of arrival data in a pair of cells within a measurement window originates from the same overlapping scan from a transmitter. An evaluation is made to determine which time of arrival data provides bearings of sufficient quality for subsequent position determining. The information centre then determines which calculated and approved bearings from adjacent pairs of cells probably originate from the same transmitter and also the same aerial sweep (that is to say lie within the correct time interval, are the same transmitter type, etc). For this determination transmitter profiles are compared in the information centre and also the probability in the scan pattern that can be derived using the times of the respective scans from a transmitter. The probability criterion assumes that the pairs of cells specify a time for the scans in the same time base system that however does not need to be adjusted to better than to tenths of a second. The time base can be corrected to this accuracy using communication links or for example using Swedish Radio's time signal or some other time signal/reference transmitted via radio. The deviation of the assumed quartz oscillators is less than one millisecond per day.

A further development of the invention is to utilise bearing measurement stations with four cells with 90° beams together covering 360° situated approximately at the corners of a square with the length of the measurement base as one side. The pair(s) of cells that in each particular case best (with greatest amplitude and with longest measurement base projected at right angles to the line of sight towards the target) receives the signals is/are used for measuring the bearing.

The invention is not restricted to the abovementioned embodiments but can be varied within the scope of the appended patent claims.

What is claimed is:

1. A method for the data reduction of times of arrival of radar signals' pulse trains detected by cells where the cells are included in a system for position determination as sub units to an information centre and where the pulse trains consist of a number of pulses, wherein the method comprises the following steps:

generating and marking a time window with a finite time extent;

calculating times of arrival for pulses in the time window relative to a start of the time window thereby deriving pulse arrival times;

calculating and associating with each pulse in the time window a pulse repetition interval estimate;

sorting pulses and their pulse arrival times into groups according to their respective pulse repetition interval estimates;

calculating a pulse repetition interval value per group based on the pulses sorted into groups,;

in each group successively reducing the pulse arrival times of the pulses in the group by the pulse repetition interval value corresponding to the group until all the pulse arrival times have a value between zero and the pulse repetition interval value corresponding to the group and thereby deriving data-reduced pulse arrival times;

in each group taking the average value of the data-reduced pulse arrival times per group and thereby deriving a calculated arrival time position per group;

successively reducing the calculated arrival time positions by a reducing value that exceeds the propagation time of the pulses between two cells in a pair of cells until the calculated arrival time position assumes a value that is greater than zero and less than the reducing value and thereby deriving a reduced arrival time position per group.

2. The method according to claim 1, wherein the method also comprises the following steps:

correlating reduced arrival time positions from two cells in a pair of cells at least based on the marking of the time windows;

calculating a bearing for the transmitter of the radar signals relative to the pair of cells based on correlated reduced arrival time positions.

3. The method according to claim 2, wherein the method also comprises the following steps:
correlating bearings calculated by different pairs of cells;
calculating by the information centre from at least two bearings that are correlated the position of the radar whose radar signals have been detected by cells.

4. The method according to claim 1, wherein the reduced arrival time position is sent to the information centre, for a bearing to be calculated, via existing public communication networks or other communication networks that are part of the total defence system.

5. The method according to claim 1, wherein the reduced arrival time position calculated in one of the cells of a pair of cells is sent to the other cell in the pair of cells for a bearing to be calculated and in that the calculated bearing for the pair of cells is sent to the information centre by the other cell via existing public communication networks or other communication networks that are part of the total defence system.

6. The method according to claim 1, wherein an initial sorting of the pulses according to pulse frequency and/or amplitude is carried out before the pulses are sorted into groups.

7. The method according to claim 2, wherein the correlation is also carried out using at least one of the parameters of the radar signals such as frequency, pulse length, coding or pulse repetition frequency.

8. A method for the data reduction of times of arrival of radar signals detected by cells, wherein time windows with a finite time extent are generated whereby times of arrival for radar signals detected in a time window are calculated relative to the start of the time window after which calculated arrival times are successively reduced by a reducing value until the calculated arrival times assume a value between zero and the reducing value.

9. A method for the data reduction of times of arrival of radar signals detected by cells, wherein at least one time window with a finite time extent is generated whereby a time of arrival for a radar signal detected in the time window is calculated relative to the start of the time window after which the calculated arrival time is successively reduced by a reducing value until the calculated arrival time assumes a value between zero and the reducing value.

10. The method according to claim 8, wherein the reducing value is greater than the maximum time of arrival difference that can arise when a radar signal is received by two cells in a pair of cells and less than the time extent of a time window.

11. The method according to claim 8, wherein an identity marking of the time window is carried out upon the generation of a time window where the identity marking is so that time windows generated in different cells can be associated with each other so that times of arrival from different cells can be correlated.

12. A system for determining the position of particular objects, objects that generate electromagnetic signals with a geographically limited and varying with time geographical extent, in an area where these objects can be detected using the electromagnetic signals that the objects generate, wherein the system comprises
at least one information centre equipped to receive information from sub units via information transfer,
at least four cells for each information centre in the system where these cells act as sub units to an information centre and where the cells are arranged in twos as pairs of cells, where each cell includes
at least one sensor for the detection of the said electromagnetic signals where the sensor comprises an aerial with associated receiver,
a real-time clock for the generation of time windows with a limited time extent,
means of recording times of arrival of pulses in a pulse train in the detected electromagnetic signals in relation to the start of the time windows,
means of calculating a pulse train arrival time from the recorded arrival times and data reducing the calculated pulse train arrival time by modulo calculation in order thereby to derive a data-reduced arrival time,
means of synchronising time windows between cells in a pair of cells,
and where the system is able to correlate data-reduced arrival times from cells in pairs of cells from characteristics of pulse trains, to calculate bearings from differences in correlated data-reduced arrival times, to correlate bearings calculated from data-reduced arrival times from different pairs of cells from absolute time and characteristics of the pulse trains and to thereafter calculate from correlated bearings the positions of the objects whose electromagnetic signals have been detected by cells in the system.

13. The system according to claim 12, wherein the said electromagnetic signals are within the radio frequency range and including radar signals.

14. The system according to patent claim 13, wherein the characteristics of the pulse trains includes at least one parameter out of either frequency, pulse length, coding or pulse repetition frequency.

15. The system according to claim 12, wherein the information transfer utilises existing public communication networks or other communication networks that are part of the total defence system and in that the data-reduced arrival times are transferred from the cells to their respective information centre by any of the said networks.

16. The system according to claim 12, wherein certain of the cells are able to be activated and deactivated from their information centre via the transfer of information.

17. The system according to claim 12, wherein the system comprises one or more groups where one or more cells are allocated into one of the said groups in accordance with particular criteria and where the criteria in accordance with which a cell is allocated into a certain group include one or more of the following: the function of the cell, design of the cell, type of information transfer for the cell or geographical location of the cell.

18. The system according to claim 17, wherein each cell has a unique address code and in that each cell belonging to a group has a group address that is the same for all the cells belonging to the same group.

19. The system according to claim 12, wherein the cells are able to be provided with new parameters from an information centre, where these parameters define the object and form a basis for decisions made by the cell.

20. The system according to claim 12, wherein the cells include a number of different programs for function and decision-making and in that an information centre is able to choose to activate any of these via the transfer of information.

21. The system according to claim 12, wherein the cells are able to receive and store one or more new programs from an information centre.

22. The system according to claim 16, wherein one or more of the cells include means for two-way communication between an information centre and this cell or these cells.

23. The system according to claim 22, wherein one or more of the cells include means for one-way communication between an information centre and this cell or these cells, in addition to the means for two-way communication and in that the activation and deactivation of cells takes place via the one-way communication.

24. The system according to claim 23, wherein one or more of the cells include a power supply via batteries and/or solar cells and in that each individual cell of these cells goes into standby mode with low power consumption in order to save power while the cell is not activated.

25. The method according to claim 9, wherein the reducing value is greater than the maximum time of arrival difference that can arise when a radar signal is received by two cells in a pair of cells and less than the time extent of a time window.

26. The method according to claim 9, wherein an identity marking of the time window is carried out upon the generation of a time window where the identity marking is so that time windows generated in different cells can be associated with each other so that times of arrival from different cell, can be correlated.

* * * * *